US006831139B2

(12) United States Patent
Kawahara et al.

(10) Patent No.: US 6,831,139 B2
(45) Date of Patent: Dec. 14, 2004

(54) METHOD FOR MANUFACTURING ETHYLENE-VINYL ACETATE COPOLYMER AND APPARATUS FOR MANUFACTURING THE SAME

(75) Inventors: Takaharu Kawahara, Okayama (JP); Masato Takai, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 132 days.

(21) Appl. No.: 10/108,457

(22) Filed: Mar. 29, 2002

(65) Prior Publication Data

US 2002/0156335 A1 Oct. 24, 2002

(30) Foreign Application Priority Data

Mar. 30, 2001 (JP) ........................................ 2001-097879

(51) Int. Cl.$^7$ ............................ C08F 2/06; C08F 218/08
(52) U.S. Cl. ...................... 526/68; 526/331; 525/330.6; 422/138
(58) Field of Search ................. 526/68, 331; 525/330.6; 422/138

(56) References Cited

U.S. PATENT DOCUMENTS 3,891,603 A * 6/1975 Heil et al. .................. 526/68
4,024,329 A * 5/1977 Lauer et al. ................ 526/61
4,485,225 A * 11/1984 Satoh et al. ................ 526/331
4,657,994 A * 4/1987 Tanaka et al. .............. 526/68
4,752,640 A * 6/1988 Tomishima et al. ......... 526/61
6,559,254 B2 * 5/2003 Ninomiya et al. .......... 526/210

OTHER PUBLICATIONS

U.S. Appl. No. 09/978,099, filed Oct. 17, 2001, pending.
U.S. Appl. No. 10/097,751, filed Mar. 15, 2002, pending.
U.S. Appl. No. 10/108,457, filed Mar. 29, 2002, pending.

* cited by examiner

Primary Examiner—Fred Teskin
(74) Attorney, Agent, or Firm—Oblon, Spivak, McClelland, Maier & Neustadt, P.C.

(57) ABSTRACT

The present invention provides a method for manufacturing an ethylene-vinyl acetate copolymer (EVA) in a polymerization solution in a vessel. The polymerization solution includes ethylene, vinyl acetate, methanol and a polymerization initiator. This method includes: cooling a gas including a vapor evaporated from the polymerization solution whereby to produce a condensate of at least a portion of said gas, and introducing said condensate into the polymerization solution whereby to evaporate at least one component in said condensate. Said vapor includes said at least one component.

19 Claims, 2 Drawing Sheets

METHOD FOR MANUFACTURING ETHYLENE-VINYL ACETATE COPOLYMER AND APPARATUS FOR MANUFACTURING THE SAME

FIELD OF THE INVENTION

The present invention relates to a method for manufacturing an ethylene-vinyl acetate copolymer (EVA) and an apparatus for the same.

BACKGROUND OF THE INVENTION

Copolymerization of ethylene with vinyl acetate generates a great deal of heat, which requires efficient removal in the continuous manufacture of EVA. In general, a cooling device such as a jacket and a coil (J&C) is used for absorbing the heat generated. However, in continuous manufacture, polymer scales adhere to a surface of the cooling device, leading to a decrease in its cooling efficiency. Thus, it is necessary to suspend manufacture at regular intervals to remove the scales.

The polymer scales adhere not only to cooling devices that touch the polymerization solution but also to a top of the vessel. The scales may then fall into the solution and cause imperfections such as fish eyes in products, for example films and containers, made from saponified EVA (ethylene vinyl-alcohol copolymer: EVOH).

To reduce these imperfections, JP 11(1999)-116637 A discloses a method for the manufacture of EVA. In this method, a top of the vessel is cooled and the temperature of the top is held lower than that of a polymerization solution (a polymerization temperature). JP 11-116637 A discloses Examples in which the temperature of the top is maintained about 10 degrees lower than the polymerization temperature (65 to 77° C. in the Examples). According to this method, the copolymerization is suppressed on the inner surface of the top and this adhesion of polymer scales there is inhibited. However, in this method, the top is cooled only for suppressing the adhesion. Cooling devices are still required to cool the polymerization solution and thus the polymer scales adhere to the surface of such a device.

JP 2(1990)-52922 B discloses another method for the manufacture of EVA. In this method, ethylene discharged from a vessel comes in contact with vinyl acetate (or a vinyl acetate solution) in a heat exchanger and is dissolved into it. The ethylene introduced with the vinyl acetate (solution) into the vessel is evaporated by the heat of polymerization. This vaporization cools the polymerization solution. The vinyl acetate (solution) is used as a solvent for circulating ethylene. According to JP 2-52922 B, the vinyl acetate (solution) should be used, because the condensation of ethylene requires a very low temperature refrigerant. JP 2-52922 B points out that heat absorption by ethylene condensation requires a great deal of ethylene circulated with a booster and that a pressure of ethylene higher than its critical point makes it impossible to condense ethylene.

The method disclosed in JP 2-52922 B employs the heat of condensation of ethylene as well as the heat of dissolution of ethylene to absorb the heat of the reaction and can allow the continuous manufacture of EVA stably over a long period without a jacket or a coil. However, in this method, one of monomers (vinyl acetate) to be supplied into a vessel should be used for the circulation of ethylene. This imposes some restrictions on the method.

First, the method cannot easily be adopted in a batch-type apparatus, because the monomers are not introduced continuously. Such batch-type apparatus is suitable for flexible manufacture of a wide variety of EVA copolymer on a small scale. Second, even in the apparatus for continuous manufacture, the method often causes problems in stability, particularly when operation conditions are forced to change considerably, for example, at the beginning or end of manufacture. In the case of an emergency stop of the operation, the supply of vinyl acetate is suspended, which causes the ethylene to stop circulating as refrigerant.

DISCLOSURE OF THE INVENTION

It was found that a gas existing above the EVA polymerization solution could be condensed at a higher temperature than the condensation point of ethylene. Surprisingly, when the condensate was introduced into the polymerization solution, the solution was cooled more effectively than would be estimated based on the heat of condensation of pure ethylene. The present invention was completed based on this new knowledge.

Viewed from one aspect, the present invention provides a method for manufacturing EVA in a polymerization solution in a vessel. The polymerization solution includes ethylene, vinyl acetate, methanol and a polymerization initiator. This method comprises: cooling a gas including a vapor evaporated from the polymerization solution whereby to produce a condensate of at least a portion of said gas; and introducing said condensate into the polymerization solution whereby to evaporate at least one component (a component or mixture of components) in said condensate. Said vapor comprises said at least one component.

Viewed from another aspect, the present invention provides a method for continuously manufacturing EVA. This method includes the following steps (a) to (d):

(a) continuously introducing ethylene, a vinyl acetate-containing liquid, methanol and a polymerization initiator into a vessel whereby to form a polymerization solution in the vessel;

(b) continuously cooling a gas that includes a vapor evaporated from the polymerization solution whereby to produce a condensate of at least a portion of said gas;

(c) continuously introducing the condensate into the polymerization solution whereby to evaporate at least one component in said condensate, wherein said at least one component (a component or mixture of components) is included in said vapor in step (b); and (d) continuously discharging a portion of the polymerization solution from the vessel.

As the vinyl acetate-containing liquid, vinyl acetate or a vinyl acetate solution can be used. The vinyl acetate solution is preferably a vinyl acetate solution in alcohol, more preferably a vinyl acetate solution in methanol.

The present invention can allow the stable manufacture of EVA over a long period even if the supply of monomers is stopped or suspended. This method can be applied to batch-type apparatus as well as to continuous operation-type apparatus. The condensate of the gas provides sufficiently large cooling effect to eliminate the need for direct cooling of the polymerization solution. Thus, the method is advantageous in suppressing the formation of polymer scales. As is evident from a large cooling effect observed and from the high condensation temperature of the gas, it is believed that the condensate is not produced from pure ethylene. Probably, cooling the gas causes some of its components other than ethylene, for example vinyl acetate and/or methanol, to condense before the ethylene condenses. The ethylene in the gas would then be dissolved into the liquefied ingredients, forming a condensate of the gas.

Viewed from still another aspect, the present invention provides an apparatus for manufacturing EVA. This apparatus includes a vessel for containing a polymerization solution comprising ethylene, vinyl acetate, methanol and a polymerization initiator, and a cooling device. In this apparatus, the cooling device is placed in a position such that the cooling device contacts a vapor evaporated from the polymerization solution but does not contact the polymerization solution.

The cooling device may be placed inside or outside the vessel. When the cooling device is positioned inside the vessel, the "position such that the cooling device does not contact the polymerization solution" will depend on the design of the vessel, but in general the position is preferably 50% or higher, more preferably 60% or higher, of the inner height of the vessel. Thus, the cooling device can be placed in the vessel at 50% or higher of the inner height of the vessel, or outside the vessel so as not to contact the polymerization solution.

The cooling device is placed so as to condense the gas including a vapor evaporated from the polymerization solution. When a cooling device is in contact with the polymerization solution, almost all of the cooling force of the device is expended on the solution as that has a higher heat transfer coefficient. The heat exchanger disclosed in JP 2-52922 B directly cools vinyl acetate that flows along the walls of the tubes in the heat exchanger, rather than directly cooling the ethylene. This device is suitable for dissolving the gas into a solvent, but is not suitable for producing a "condensate" of the gas. JP 11-116637 A discloses a cooling device that contacts a top of the vessel rather than the vapor evaporated from the polymerization solution. To condense the gas on the wide top of the vessel would require a cooling device with an excessively high cooling ability. As is evident in JP 11-116637 A, the top of the vessel, which has a large heat capacity, can be cooled such that the adhesion of polymer scales is suppressed, but the temperature of the top does not fall low enough to condense.

DESCRIPTION OF THE PREFERRED EMBODIMENTS

Figure 1:
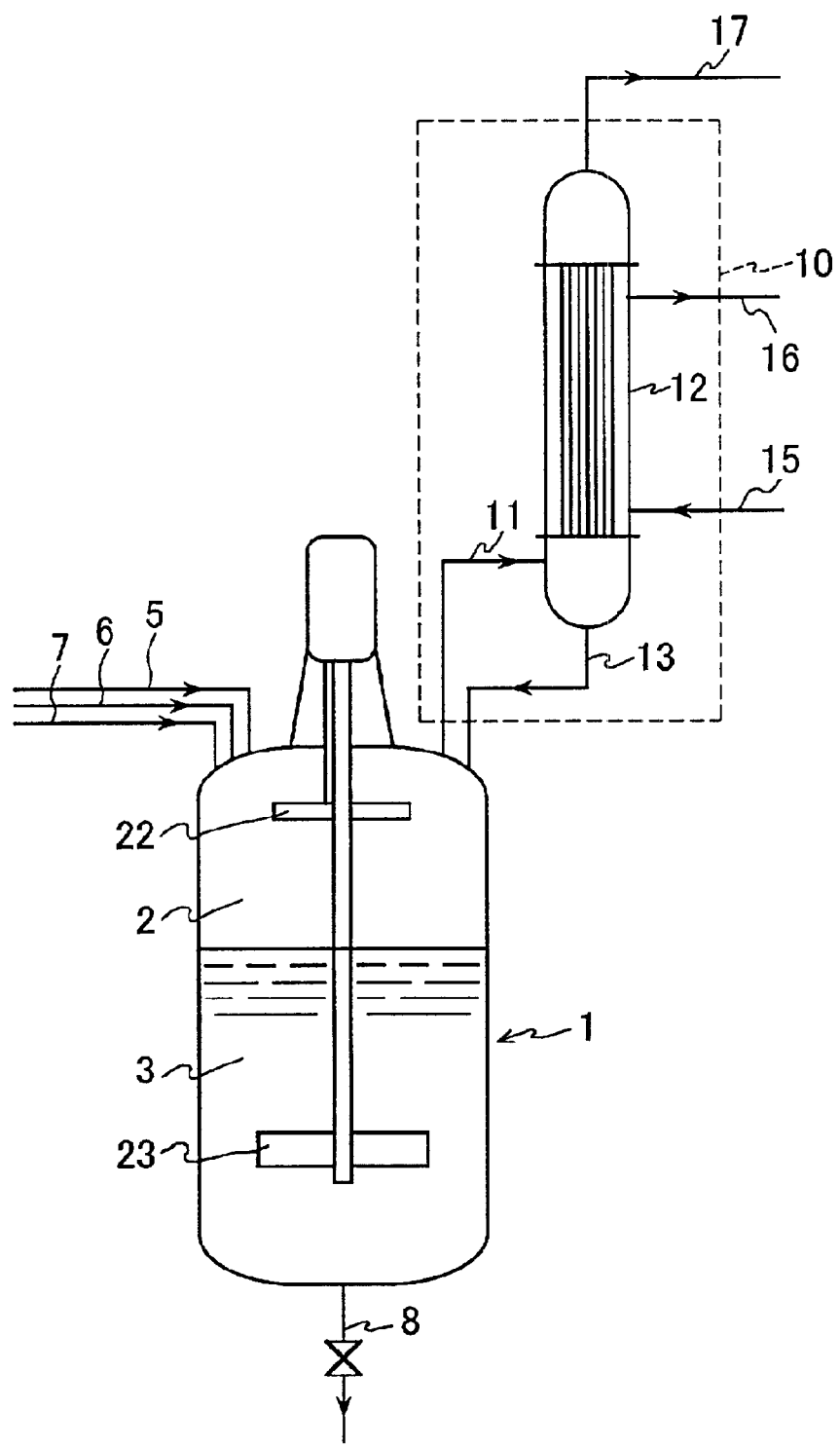
FIG. 1 is a cross sectional view showing one embodiment of an apparatus in accordance with the present invention.

The following description will depict a preferred embodiment of the present invention.

The component or mixture of components vaporized from the condensate preferably includes ethylene, and more preferably further includes at least one component of the polymerization solution other than ethylene, for example at least one selected from vinyl acetate and methanol. The heat of polymerization generated in the polymerization solution can be absorbed by i) condensing at least a portion of the gas comprising ethylene to produce a condensate and ii) introducing the condensate into the polymerization solution.

The temperature of the polymerization solution (a polymerization temperature), which depends on the conversion of the monomers, the polymerization degree and the like, is preferably not less than 30° C. and not more than 80° C., more preferably not less than 40° C. and not more than 80° C. The temperature of the condensate to be returned to the vessel is not less than −5° C. and not more than 30° C. If the temperature of the condensate is excessively high, sufficient cooling effect may not be obtained. On the other hand, an excessively low temperature may considerably impair the temperature uniformity to the polymerization solution. To hold the temperature of the condensate in the above preferable range, the cooling temperature for the gas is preferably not less than −10° C. and not more than 25° C. Here, "the cooling temperature" means, for example the temperature of a refrigerant that is supplied to a heat exchanger or similar cooling device. The temperature ($T_2$) of the condensate should be controlled such that $T_2$ is held lower than the temperature ($T_1$) of the polymerization solution (i.e. $T_2<T_1$).

The condensate can be produced outside or inside the vessel. In the former embodiment, hardly condensed gaseous components such as nitrogen can easily be discharged. In the latter embodiment, the use of an external device can be omitted and therefore reduce the cost and complexity of the apparatus. The gas may be condensed both outside and inside the vessel. To distribute gas components uniformly and to aid the condensation, the gas in the vessel should be agitated.

When condensing the gas comprising a vapor from the polymerization solution outside the vessel, the vessel and the cooling device should be connected with pipes. The pipes should include a first pipe for introducing the gas to be condensed from the vessel into the cooling device and a second pipe for introducing the condensate from the cooling device into the vessel. This apparatus preferably includes a third pipe that connects between a vinyl acetate source and the vessel without passing through the cooling device, whereby the gas can be condensed separately from the supply of vinyl acetate-containing liquid. With this arrangement, the condensate can be produced before the gas to be condensed contacts the vinyl acetate-containing liquid. This apparatus more preferably includes a fourth pipe that has one end connected to the cooling device. This fourth pipe can be used to discharge at least a portion of the uncondensed gaseous remainder from the cooling device. Through the fourth pipe, low active (inert) gas components such as nitrogen can be released from the apparatus.

When condensing the gas inside the vessel, the cooling device should be placed so as to contact the gas phase in the vessel and so as to avoid contact with the polymerization solution. The cooling device is preferably arranged such that neither the polymerization solution nor the vessel contacts any heat-transfer surface of the cooling device. The heat-transfer surface that touches the gas phase only can cool and condense at least a portion of the gas efficiently.

According to a preferable embodiment of the invention, all the heat of polymerization generated in the polymerization solution can be absorbed by evaporating at least one component of the condensate from the solution. In another embodiment of the invention, other auxiliary cooling means such as a coil and/or a jacket may be used to cool the polymerization solution.

The present invention can be applied to the continuous manufacture of EVA and the manufacture process preferably includes the above-identified steps (a) to (d). In one embodiment of this method, it is preferable that the gas is condensed with a cooling device outside the vessel in step (b) and the vinyl acetate-containing liquid is introduced into the vessel without passing through the cooling device in step (a). In another preferred embodiment, at least a portion of the gas is condensed with a cooling device that is placed inside the vessel, and the cooling device is placed so as to contact a gas phase in the vessel and so as to avoid any contact with the polymerization solution.

The cooling device may be a heat exchanger that is connected to a refrigerant source. This may be the only liquid source connected to the heat exchanger. The liquid sources, for example a vinyl acetate (-containing liquid) source and/or a methanol source, are preferably connected directly to the vessel without passing through the cooling device.

Examples of the materials for the copolymerization are as follows, however, other materials used in conventional EVA polymerization methods also may be substituted.

Methanol is used as the primary polymerization solvent, but other components may be added. An aliphatic alcohol having not more than four carbon atoms is suitable for the other components. Examples of aliphatic alcohols include ethanol, n-propanol, i-propanol, n-butanol and t-butanol. The preferred amount of polymerization solvent to use is in the range of 0.1 to 50 weight parts, in particular of 1 to 30 weight part, with respect to 100 weight part of vinyl acetate.

As the polymerization initiator, at least one compound selected from diacylperoxide-based initiators, valeronitrile-based initiators, and peroxydicarbonate-based initiators are preferably used, although the initiator is not limited to these. Examples of diacylperoxide-based polymerization initiators include acetyl peroxide, dipropyl peroxide, isobutyryl peroxide, benzoyl peroxide, dilauroyl peroxide. Examples of valeronitrile-based polymerization initiators include 2,2'-azobis(2,4,4'-trimethyl valeronitrile), 2,2'-azobis(2,4-dimethyl valeronitrile), 2,2'-azobis(4-methoxy-2,4-dimethyl valeronitrile), 2,2'-azobis(4-ethoxy-2,4-diethyl valeronitrile), 2,2'-azobis(4,4'-diethoxy-2-methyl valeronitrile). Examples of peroxydicarbonate-based polymerization initiators include dicyclohexyl peroxydicarbonate, bis(4-t-butylcyclohexyl) peroxydicarbonate, di-n-propyl peroxydicarbonate. Among these, acetyl peroxide, 2,2'-azobis(4-methoxy-2,4-dimethyl valeronitrile), di-n-propyl peroxydicarbonate, and dicyclohexyl peroxydicarbonate are suitable for the present invention. Further, 2,2'-azobis(4-methoxy-2,4-dimethyl valeronitrile) is most preferable.

To remove the heat of polymerization effectively, the polymerization solution in the vessel preferably has not less than a predetermined concentration of ethylene. Thus, the EVA from the solution preferably contains not less than 5 mol %, more preferably not less than 10 mol %, and further preferably not less than 20 mol % of ethylene. If EVA that contains less than 5 mol % of ethylene should be continuously manufactured, it is necessary to decrease the supply of vinyl acetate or increase the supply of the polymerization solvent in order to sufficiently reduce the heat of polymerization. This decreases productivity and raises production costs.

To obtain EVA that has a relatively high ethylene content, the polymerization solution in the vessel should have a high concentration of ethylene. This requires a high partial pressure of ethylene. An excessively high internal pressure increases the load on the vessel. Thus, the EVA formed from the polymerization solution should preferably contain not more than 60 mol %, more preferably not more than 55 mol %, and further preferably not more than 50 mol % of ethylene for safety. The pressure of gas in the vessel (polymerization pressure), which depends on the ethylene content of the EVA to be manufactured, is preferably not less than 20 kg/cm$^2$ and not more than 80 kg/cm$^2$.

It is possible to supply other polymerizable monomers during the polymerization process so as to permit copolymerization of the same. The monomers should be selected such that the monomers do not interfere with the effect of the invention. Examples of the polymerizable monomers used for copolymerization include: α-olefins such as propylene, n-butene, i-butene, 4-methyl-1-pentene, 1-hexene, 1-octene and 1-dodecene; unsaturated carboxylic acids such as acrylic acid, methacrylic acid, crotonic acid, maleic acid and itaconic acid, salts of the same, anhydrides of the same and esterified products of the same, e.g. mono or dialkylester of the same; nitrites such as acrylonitrile and methacrylonitrile; amides such as acrylamide and methacrylamide; and olefinsulfonic acids such as ethylenesulfonic acid, allylsulfonic acid and methallylsulfonic acid, and the salts of the same. The examples also include alkyl vinyl ethers, vinyl ketones, N-vinyl pyrrolidones, vinyl chlorides and vinylidene chlorides.

In the apparatus of FIG. 1, pipes 5, 6, 7 are connected to the polymerization vessel 1. The number and positions are not limited to that shown in the drawing. At least ethylene, methanol, vinyl acetate or a vinyl acetate solution, and a polymerization initiator are supplied from the pipes to form a liquid phase (polymerization solution) 3 with a gas phase 2 in the vessel. The methanol can be introduced as part of the vinyl acetate solution. The phases 2,3 can be stirred with agitators 22, 23, respectively. These agitators may have a common axis of rotation. The materials such as vinyl acetate and methanol are directly introduced without passing through heat exchanger 12. The polymerization solution 3 can be drained after the copolymerization or a part of the solution can be drained continuously during the copolymerization through drainpipe 8, connected to a bottom portion of the vessel.

A gas condenser system 10 is connected to the vessel 1 so as to remove the heat produced by the copolymerization. The condenser system 10 includes a heat exchanger 12 and two pipes 11, 13 for connecting the exchanger with the vessel. The pipe 11 is set to introduce a gas from above the polymerization solution 3 into the heat exchanger. The heat exchanger 12 produces a condensate of the gas while transferring heat from the gas to a refrigerant that is introduced from pipe 15 and drained through pipe 16. Pipe 13 is set to introduce the condensate from the exchanger into the liquid phase 3. The refrigerant may optionally be introduced from the upper pipe 16 instead of from the lower pipe 15.

Although the gas condenser system 10 may be a closed system that does not permit the substances to go in or out, the condenser system in FIG. 1 includes a gas release pipe (discharge pipe) 17. The uncondensed gaseous remainder in the heat exchanger 12 can be discharged out through pipe 17. In the continuous manufacture of EVA, discharging at least a portion of the gaseous remainder suppresses the accumulation of low-active gas components in the apparatus. As a result, the partial pressure of ethylene does not significantly decrease and the proportion of ethylene to vinyl acetate incorporated into the EVA can be easily maintained at a predetermined value. Discharge pipe 17 is preferably connected to the position higher than those to which the gas introducing pipe 11 and the condensate discharging pipe 13 are connected.

As the heat exchanger 12, various types including a coil-type exchanger and a plate-type exchanger can be used. To efficiently condense the gas and efficiently discharge the condensate, a multi-tubular heat exchanger is preferable. Since the apparatus in FIG. 1 does not require a liquid absorber for dissolving the gas, there is much flexibility in designing heat exchanger 12. In methods requiring ethylene to dissolve in an absorber liquid, it is necessary to supply the absorber sufficiently rapidly and uniformly for efficient dissolution. The diameters and intervals of the tubes in a multi-tubular heat exchanger for use in these methods should therefore be kept relatively large. This consideration need not be given to the heat exchanger 12 as a result of the present invention and thus the exchanger can be designed compactly. Other cooling devices such as a coil and a jacket can be used with the condenser system 10 so as to directly cool the polymerization solution, if necessary.

Figure 2:
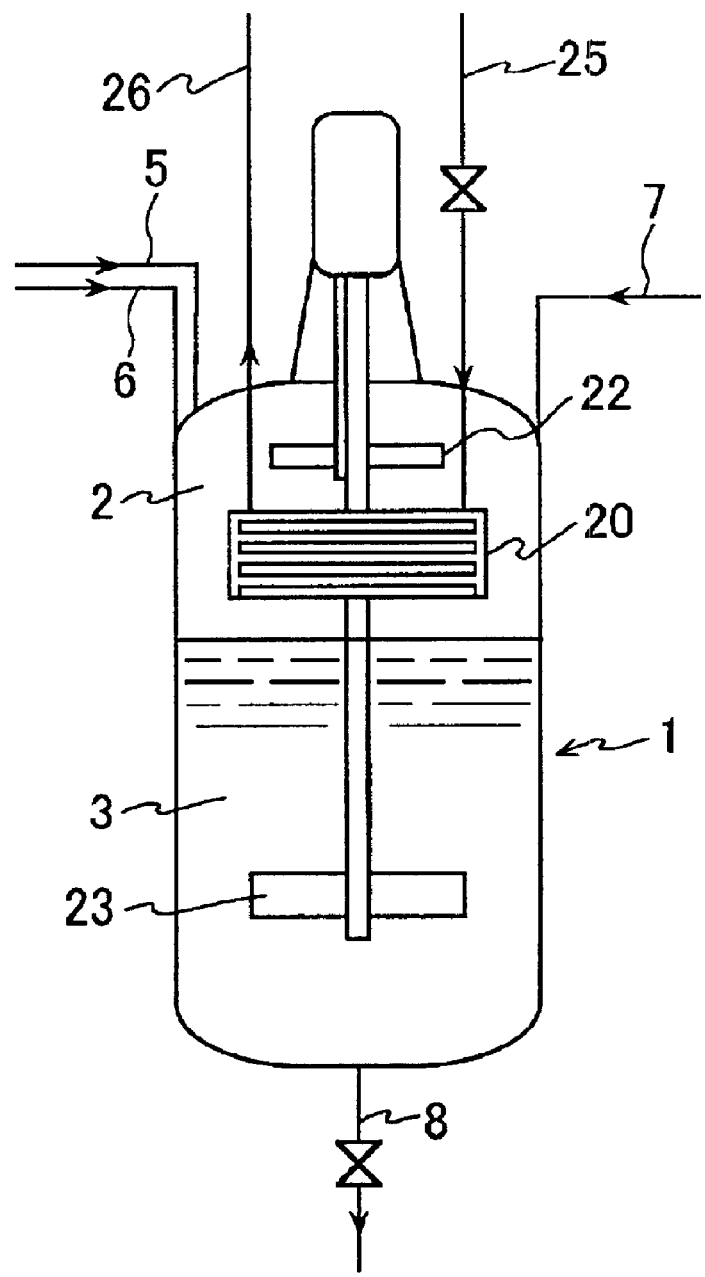
FIG. 2 is a cross sectional view showing another embodiment of an apparatus in accordance with the present invention.

The apparatus in FIG. 2 also has pipes 5, 6, 7 that are connected to vessel 1. The vessel has a gas phase 2, a liquid phase 3, agitators 22, 23 in the phases and a drainpipe 8.

In this apparatus, a coil 20 as a heat exchanger is placed within the vessel, instead of having a gas condenser system 10. The coil 20 is installed inside the vessel so as not to touch the liquid phase (polymerization solution) 3 and so as to cool only the gas phase 2. The coil condenses a gas in the gas phase while exchanging heat between the gas and a refrigerant that is supplied and drained through pipes 25, 26. The coil preferably has sufficient cooling ability to remove all the heat generated by the copolymerization. Other cooling devices such as a coil and a jacket can be used with the coil 20 so as to directly cool the polymerization solution, if necessary.

In the apparatus shown in the drawings, the heat of condensation of the components other than ethylene, such as vinyl acetate and methanol as well as the heat of condensation and dissolution of ethylene are employed to remove the heat generated by the polymerization reaction. Thus, EVA can be manufactured stably over a long period.

A portion of the gas in the gas phase above the polymerization solution turns into a condensate and this condensate returns to the liquid phase to vaporize again. This cooling operation with gas-liquid circulation can be conducted separately from the supply of raw materials. Thus, this cooling operation can be easily applied to a batch-type apparatus. In a continuous operation-type apparatus, starting, finishing and emergency stopping operations are made more stable. In addition, the formation of polymer scale on the inner surface of the vessel is reduced with respect to a conventional operation in which the heat reduction relies on direct cooling of the polymerization solution.

EVA obtained by the present invention can be saponified to EVOH by known saponification methods using an alkali catalyst. EVA can be saponified in a continuous operation or a batch operation. The degree of EVOH saponification is preferably not less than 95%, more preferably not less than 99%. In the case where the degree of saponification is insufficient, the gas barrier properties may deteriorate. To improve interlayer adhesiveness or the like, the degree of saponification may be in a range of about 80% to 95%. This EVOH can be used alone or in combination with EVOH having a saponification degree of not less than 99%. The present invention encompasses the EVA obtainable by the above-described method and a method for the manufacture of an EVOH comprising saponifying the EVA obtained by the above-described method.

EVOH obtainable by the above method preferably has a melt flow rate (MFR) in the range of 0.1 gram per ten minutes (g/10 min) to 100 g/10 min. Here, the MFR of EVOH is measured at 190° C. under a load of 2160 g, according to the Japanese Industrial Standard (JIS) K7210. In the case where the EVOH has a melting point in the vicinity of or above 190° C., the MFR is a value obtained by extrapolating to 190° C. using a semilogarithmic graph with the reciprocal of absolute temperature as the horizontal axis and the MRF as the vertical axis (logarithm). In this case, measurement should be carried out at a plurality of temperatures higher than the melting point under a load of 2160 g.

Various kinds of additives may be added to EVOH, according to necessity. Examples of such additives include antioxidants, plasticizers, thermal stabilizers, ultraviolet absorbers, antistatic agents, lubricants, colorants, fillers, and other thermoplastic resins. EVOH is moldable by known molding methods into various kinds of molded products such as films, sheets, pipes, tubes, and bottles.

EXAMPLES

The following description will depict the present invention in more detail while referring to examples, but the present invention is not limited to these examples.

Example 1

An ethylene-vinyl acetate copolymer (EVA) was continuously manufactured in an apparatus comprising a polymerization vessel having a capacity of 660 L and an upright wetted-wall multi-tubular heat exchanger positioned outside the vessel. The heat exchanger had eight tubes and a cooling area (area of heat-transfer surface) of 3 $m^2$. Pipes were arranged between the vessel and the heat exchange so as to transfer a gas from the vessel into the heat exchanger and a condensate generated in the heat exchanger into the vessel. The materials for the copolymerization were directly introduced into the vessel without passing through the heat exchanger. No coil was placed in the vessel and the temperature of a jacket was held at the polymerization temperature. In this apparatus, the heat of polymerization was extracted only by the heat exchanger.

EVA was manufactured at a polymerization pressure of 58 $kg/cm^2$, a polymerization temperature of 60° C., a vinyl acetate supply rate of 34 kg/hr and a polymerization rate (with reference to the vinyl acetate) of 35%. In the continuous manufacture, the gas and liquid phases within the vessel were stirred with agitators. The temperature of the brine used as refrigerant for the heat exchanger was 4.5° C. before introduction and 11° C. after exiting the heat exchanger. It was intended that the flow of brine would be adjusted so as to maintain the above temperatures, but in practice the rate was kept at 1100 L/hr during continuous manufacture. No increase in refrigerant flow was necessary. The temperature of the condensate supplied into the vessel was 20° C.

In this continuous operation, the heat estimated from the heat of polymerization between ethylene and vinyl acetate is about 5350 kcal/hr (about 22.4 MJ/hr) while the heat absorbed by the heat exchanger was 6500 kcal/hr (about 27.2 MJ/hr). Thus, EVA (ethylene content: 42 mol %) was manufactured stably for 20 days while removing the heat of copolymerization with a heat exchanger placed outside the vessel. No polymer scales were found in the liquid phase after the operation.

Example 2

EVA was continuously manufactured in the same manner as in Example 1 except that the heat exchanger outside the vessel was substituted with a heat exchanger (coil) placed in the gas phase within the polymerization vessel. The coil had a cooling area of 3 $m^2$ and was set so as to avoid touching the polymerization solution. The temperatures of the brine used as refrigerant for the heat exchanger was 4.0° C. before introduction and 11° C. after exiting the heat exchanger. It was intended that the flow of brine would be adjusted so as to maintain the above temperatures, but in practice the rate was kept at 1100 L/hr during the continuous manufacture. No increase in refrigerant flow was necessary.

In this continuous operation, the heat estimated from the heat of polymerization between ethylene and vinyl acetate is about 5350 kcal/hr (about 22.4 MJ/hr) while the heat absorbed by the heat exchanger was 7000 kcal/hr (about 29.3 MJ/hr). Thus, EVA was manufactured stably for 20 days while removing the heat of the copolymerization with a coil positioned in the gas phase. No polymer scales were found in the liquid phase after the operation.

Comparative Example

EVA was continuously manufactured in the same manner as that in the Examples except that the heat was removed with a jacket and a coil instead of the heat exchanger for cooling the gas phase. The coil was placed so as to directly cool the liquid phase in the vessel. The jacket and the coil had 10 m² of a total cooling area and were set at 45° C. in the beginning of the copolymerization. As the reaction proceeded, it was necessary to lower the temperature of the J&C. Finally, the temperature approached 25° C., which was a temperature of the refrigerant cooling the J&C. The polymerization was therefore suspended. The operation was started again with a jacket and a coil having 15 m² of a total cooling area. However, polymer scales still adhered to the J&C and lowered the cooling ability of the J&C. This forced the operation to be stopped about 10 days later. A great deal of polymer scales were found on the surface of the J&C.

Further, in this apparatus, the refrigerant cooling the J&C was substituted with a brine at 4.5° C. as in Example 1, which improved the cooling ability. However, polymer scales still adhered to the J&C and forced the operation to be stopped about 7 days later. A great deal of polymer scales were found on the surface of the J&C.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing an ethylene-vinyl acetate copolymer, comprising:

cooling a gas comprising a vapor evaporated from a polymerization solution in a vessel to thereby produce a condensate of at least a portion of said gas, and introducing said condensate into the polymerization solution to thereby evaporate at least one component in said condensate, wherein said polymerization solution comprises ethylene, vinyl acetate, methanol and a polymerization initiator, wherein said vapor comprises said at least one component, wherein said at least one component comprises ethylene and at least one component of the polymerization solution other than ethylene.

2. The method as claimed in claim 1, wherein the polymerization solution is maintained at not less than 30° C. and not more than 80° C.

3. The method as claimed in claim 1, wherein said condensate is formed by cooling said gas to a temperature above the condensation temperature of pure ethylene.

4. The method as claimed in claim 1, wherein said condensate is formed by cooling said gas to not less than −10° C. and not more than 25° C.

5. The method as claimed in claim 1, wherein said gas is agitated in the vessel.

6. The method as claimed in claim 1, wherein said condensate is produced outside the vessel.

7. The method as claimed in claim 6, further comprising introducing a vinyl acetate-containing liquid into the polymerization solution, wherein said condensate is formed before contacting said at least a portion of said gas with said polymerization solution.

8. The method as claimed in claim 1, wherein said condensate is produced in the vessel.

9. The method as claimed in claim 8, wherein said condensate is formed on a surface of a cooling device placed in the vessel, wherein said cooling device is placed so as to contact a gas phase in the vessel and so as not to contact the polymerization solution.

10. The method as claimed in claim 1, wherein all the heat of polymerization generated in the polymerization solution is absorbed by evaporating said at least one component of said condensate.

11. A method for continuously manufacturing an ethylene-vinyl acetate copolymer, comprising:

(a) continuously introducing ethylene, a vinyl acetate-containing liquid, methanol and a polymerization initiator into a vessel to thereby form a polymerization solution in the vessel;

(b) continuously cooling a gas that comprises a vapor evaporated from the polymerization solution to thereby produce a condensate of at least a portion of said gas;

(c) continuously introducing the condensate into the polymerization solution to thereby evaporate at least one component in said condensate, wherein said vapor in step (b) comprises said at least one component, wherein said at least one component comprises ethylene and at least one component of the polymerization solution other than ethylene; and (d) continuously discharging a portion of the polymerization solution from the vessel.

12. The method as claimed in claim 11, wherein said gas is condensed in step (b) with a cooling device placed outside the vessel, and wherein the vinyl acetate-containing liquid in step (a) is introduced into the vessel without passing through said cooling device.

13. The method as claimed in claim 11, wherein said condensate is formed on a surface of a cooling device placed within the vessel, wherein said cooling device is placed so as to contact a gas phase in the vessel and so as not to contact the polymerization solution.

14. A method for manufacturing of an ethylene-vinyl alcohol copolymer, comprising:

producing an ethylene-vinyl acetate copolymer by the method as claimed in claim 1, and subsequently, saponifying the ethylene-vinyl acetate copolymer.

15. An apparatus for manufacturing an ethylene-vinyl acetate copolymer, comprising:

a vessel for containing a polymerization solution that comprises ethylene, vinyl acetate, methanol and a polymerization initiator; and a cooling device;

a first pipe and a second pipe that connect the vessel to the cooling device; and a third pine that connects the vessel to a source of vinyl acetate without passing through the cooling device;

wherein said cooling device is placed outside the vessel such that the cooling device contacts a vapor evaporated from the polymerization solution and does not contact the polymerization solution;

wherein said cooling device is a heat exchanger; and wherein said heat exchanger is not connected to a liquid source other than a refrigerant source that supplies a refrigerant to the heat exchanger.

16. The apparatus as claimed in claim 15, further comprising a fourth pipe for discharging at least a portion of the gaseous remainder of said gas from the cooling device, wherein the fourth pipe has one end that is connected to the cooling device.

17. An apparatus for manufacturing an ethylene-vinyl acetate copolymer, comprising:

a vessel for containing a polymerization solution that comprises ethylene, vinyl acetate, methanol and a polymerization initiator; and a cooling device;

wherein said cooling device is placed within the vessel such that the cooling device contacts a vapor evaporated from the polymerization solution and does not contact the polymerization solution;

wherein said cooling device is a heat exchanger; and wherein said heat exchanger is not connected to a liquid source other than a refrigerant source that supplies a refrigerant to the heat exchanger.

18. The apparatus as claimed in claim 17, wherein said cooling device has a heat-transfer surface, and wherein neither the polymerization solution nor the vessel contacts said heat-transfer surface.

19. An apparatus for manufacturing an ethylene-vinyl acetate copolymer, comprising:

a vessel for containing a polymerization solution that comprises ethylene, vinyl acetate, methanol and a polymerization initiator, said vessel being connected to a source of ethylene and a source of vinyl acetate; and a cooling device;

wherein said cooling device is placed such that the cooling device contacts a vapor evaporated from the copolymerization solution and does not contact the polymerization solution, wherein said cooling device is a heat exchanger, and wherein said heat exchanger is not connected to a liquid source other than a refrigerant source that supplies a refrigerant to the heat exchanger.

* * * * *